(12) United States Patent
Wen et al.

(10) Patent No.: US 10,958,651 B2
(45) Date of Patent: Mar. 23, 2021

(54) METHOD OF PROVIDING NOMADIC SERVICE THROUGH VIRTUAL RESIDENTIAL GATEWAY

(71) Applicant: Alcatel Lucent, Boulogne-Billancourt (FR)

(72) Inventors: Haibo Wen, Shanghai (CN); Kaibin Zhang, Shanghai (CN); Shuigen Yang, Shanghai (CN); Fanxiang Bin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 258 days.

(21) Appl. No.: 15/529,711

(22) PCT Filed: Oct. 19, 2015

(86) PCT No.: PCT/IB2015/002242
§ 371 (c)(1),
(2) Date: May 25, 2017

(87) PCT Pub. No.: WO2016/083889
PCT Pub. Date: Jun. 2, 2016

(65) Prior Publication Data
US 2017/0339147 A1 Nov. 23, 2017

(30) Foreign Application Priority Data
Nov. 28, 2014 (CN) .......................... 201410714099.1

(51) Int. Cl.
*H04L 29/06* (2006.01)
*H04L 12/24* (2006.01)
(Continued)

(52) U.S. Cl.
CPC .......... *H04L 63/0892* (2013.01); *H04L 12/66* (2013.01); *H04L 41/0806* (2013.01);
(Continued)

(58) Field of Classification Search
CPC . H04L 63/0892; H04L 67/18; H04L 41/0806; H04L 41/20; H04L 12/66; H04W 4/02; H04W 12/06
See application file for complete search history.

(56) References Cited

U.S. PATENT DOCUMENTS

2006/0239254 A1* 10/2006 Short ................ H04W 12/0806
370/352
2008/0162637 A1* 7/2008 Adamczyk ............ H04L 51/043
709/204
(Continued)

FOREIGN PATENT DOCUMENTS

CN          103067268 A        4/2013

OTHER PUBLICATIONS

Nomadism/FMC Use Cases and AAA Impact, Hans et al. (Year: 2006).*
(Continued)

*Primary Examiner* — Alexander Lagor
*Assistant Examiner* — Vu V Tran
(74) *Attorney, Agent, or Firm* — Harness, Dickey & Pierce, P.L.C.

(57) ABSTRACT

The invention provides a method of providing a nomadic service, the method including: i. sending, by a user, a nomadic service request to an Authentication, Authorization and Accounting (AAA) server to determine whether the nomadic service request is allowed; ii. if the nomadic service request is allowed, then instantiating a service module for the nomadic service in a corresponding virtual Residential Gateway (vRG) platform, or selecting a corresponding service module in a residential gateway of the user, based upon the nomadic service, by a Software Defined Network (SDN) controller; and iii. determining and configuring, by the SDN controller, a network delivery path between the user and the service module based upon the path establishment request (Continued)

and a position of the service module. With the technical solution according to the invention, even a user who is not at home can be provided rapidly with a service subscribed through a residential gateway.

12 Claims, 3 Drawing Sheets

(51) Int. Cl.
*H04L 29/08* (2006.01)
*H04W 4/02* (2018.01)
*H04W 12/06* (2021.01)
*H04L 12/66* (2006.01)

(52) U.S. Cl.
CPC .............. *H04L 41/20* (2013.01); *H04W 12/06* (2013.01); *H04L 67/18* (2013.01)

(56) References Cited

U.S. PATENT DOCUMENTS

| | | | |
|---|---|---|---|
| 2010/0115113 A1 | 5/2010 | Short et al. | |
| 2013/0031271 A1* | 1/2013 | Bosch | H04W 40/36 709/245 |
| 2014/0146664 A1 | 5/2014 | Amante | |
| 2014/0172947 A1* | 6/2014 | Ghai | H04L 65/102 709/202 |
| 2014/0226642 A1* | 8/2014 | Haddad | H04L 12/2898 370/338 |
| 2015/0271102 A1* | 9/2015 | Antich | H04L 47/825 370/230 |
| 2016/0127886 A1* | 5/2016 | Hu | H04M 15/66 455/432.3 |
| 2016/0164699 A1* | 6/2016 | Ma | H04L 61/2503 726/12 |

OTHER PUBLICATIONS

International Search Report PCT/ISA/210 for International Application No. PCT/IB2015/002242 dated Mar. 21, 2016.
Office Action for corresponding Korean Application No. 10-2017-7017824 dated Feb. 19, 2019.
Ruckert, Julius et al. "Flexible Traffic Management in Broadband Access Networks using Software Defined Networking" pp. 1-8, Mar. 11, 2019.
Naoki Higo et al., "A study of implementation method of mobility related virtualized Residential Gateway," Proceedings of the 2014 IEICE General Conference, Communication 2, Mar. 4, 2014, p. 223.
Office Action for Japanese Application No. 2017-528482 dated Jul. 3, 2018.
Xiongyan Tang et al., "SDN-Based Broadband Network for Cloud Services", ZTE Communications, Jun. 2014, pp. 18-22.
Office Action for corresponding European Application No. 15 816 865.8 dated Oct. 7, 2019.
Intellectual Property of India Examination Report dated Jan. 8, 2020 for Indian Patent Application No. 201717018596.

* cited by examiner

METHOD OF PROVIDING NOMADIC SERVICE THROUGH VIRTUAL RESIDENTIAL GATEWAY

CROSS-REFERENCE TO RELATED APPLICATIONS

This application is the U.S. National Phase application of PCT Application No. PCT/IB2015/002242 filed on Oct. 19, 2015, which claims priority to Chinese Application No. 201410714099.1 filed on Nov. 28, 2014, the contents of each of which are incorporated herein by reference.

FIELD OF THE INVENTION

The present disclosure generally relates to the field of access communications and particularly to a method of providing a nomadism service through a virtual residential gateway.

BACKGROUND OF THE INVENTION

In fact, no matter where a user is, he would like to be provided with the same service and experience as he is at home. In another word, even if he is in a nomadic site, he would like to obtain the service subscribed at home, e.g., a high-definition TV program, IPTV, various OTT services, etc.

In real life, we may be faced with the following scenarios or the like: if a home network 1 is a home network of a user 1-1, a user 1-2, and a user 1-3, and a home network 2 is a home network of a user 2-1 and a user 2-2, then (1) the user 1-3 visiting the home of the user 2-1 tries to invite the user 2-1 to watch high-definition TV subscribed the by user 1-3 through a Residential Gateway (RG, i.e., RG-1); and (2) the user 2-2 roaming in another pace wants to obtain a service subscribed by the user 2-2 at home.

The architecture of a Network Enhanced. Residential Gateway (NERC) proposed in the Broadband Forum (BBF) has modified most of service and network functions of the residential gateway to extend a local LAN outside the home of the user. Such functions as IP forwarding, routing, NAT and IP addressing related functions can be arranged on a Virtual Gateway (vG) so that the residential gateway acts as a bridge. In addition, some service modules corresponding to application services purchased in the home network (originally implemented in the home gateway) are also implemented in the virtual Residential Gateway (vRG).

In fact, wherever the user is nomadic, he generally prefers to be provided with a uniform and consistent experience of the user, so he generally prefers the services frequently subscribed through the residential gateway.

Thus it is highly desirable to support a nomadic service through the virtual residential gateway in the access network.

SUMMARY OF THE INVENTION

In view of the problem, the invention defines a procedure in which a user is provided with a service subscribed by the user in a residential gateway, through a virtual residential gateway.

The invention provides a method of providing a nomadic service, the method including: i. sending, by a user, a nomadic service request to an Authentication, Authorization and Accounting (AAA) server to determine whether the nomadic service request is allowed; ii. if the nomadic service request is allowed, then instantiating a service module for the nomadic service in a corresponding virtual Residential Gateway (vRG) platform, or selecting a corresponding service module in a residential gateway of the user, based on the nomadic service, by a Software Defined Network (SDN) controller; and iii. determining and configuring, by the SDN controller, a network delivery path between the user and the service module based upon a path establishment request and a position of the service module.

Preferably the step (i) includes: sending, by the user, the nomadic service request to a nomadic service portal website through network connection provided by a current vRG, and then sending, by the nomadic service portal website, an access request including the nomadic service request to the AAA server.

Preferably the step (i) includes: sending, by the user, an authentication request including the nomadic service request to the SDN controller through a current vRG, and sending, by the SDN controller, an access request including the authentication request to the AAA server, or sending, by the current vRG, the authentication request directly to the AAA server; and the step (iii) includes: sending, by the AAA server, the path establishment request to the SDN controller.

Preferably the step (ii) includes: checking, by the AAA server, whether the nomadic service has been subscribed by the residential gateway of the user, and if yes, then further checking, by the AAA server, whether the user is allowed to be provided with the nomadic service, by using the residential gateway of the user.

Preferably the step (ii) includes: determining the position of the service module based upon mobility of the user, and an implementation of the vRG in the network, wherein when each of the vRGs in the network is implemented in a centralized vRG platform, the SUN controller selects the service module in the residential gateway of the user for the nomadic service; and when the vRGs in the network are implemented in a distributed manner, the SDN controller instantiates the service module in a current vRG of the user, or instantiates a temporary virtual gateway including the service module in the centralized vRG platform, based upon the mobility of the user; wherein the centralized vRG platform is located in a broadband network gateway (BNG) or between the BNG and a home network access node or in a data center connected with an access network.

Preferably the step (iii) further includes: when the nomadic service request is allowed, sending, by the SDN controller, an access grant message to the current vRG to thereby provide the user with an IP address, and to send the path establishment request to the SDN controller, through the current vRG.

The invention further provides a method of managing a nomadic service in a Software Defined Network (SDN) controller, the method including: i. receiving a path establishment request to deliver the nomadic service; ii. instantiating a service module for the nomadic service in a corresponding virtual Residential Gateway (vRG) platform, or selecting a corresponding service module in a residential gateway of the user, based upon the nomadic service; and iii. determining and configuring a network delivery path between the user and the service module based upon the path establishment request, and the position of the service module.

Preferably the step (ii) includes: determining the position of the service module based upon mobility of the user, and implementation manner of vRGs in the network, wherein when each of the vRGs in the network is implemented in a centralized vRG platform, the controller selects the service module in the residential gateway of the user for the nomadic service; and when the vRGs in the network are implemented in a distributed manner, the controller instantiates the service module in a current vRG of the user, or instantiates a temporary virtual gateway including the service module in the centralized vRG platform, based upon the mobility of the user; wherein the centralized vRG platform is located in a broadband network gateway (BNG) or between the BNG and a home network access node or in a data center connected with the access network.

Preferably the delivery path establishment request includes information about a current residential gateway of the user, a nomadic service provision point request, and a bandwidth corresponding to the nomadic service.

Preferably the step (ii) further includes: locating, by the controller, the nomadic service provision point at the determined position of the service module after determining the position of the service module. The position can be the vRG or the virtual gateway.

Preferably the step (i) further includes: when the nomadic request received by the controller is included in an authentication request of the user, incorporating, by the controller, the authentication request into an access request, and sending the access request to an Authentication Authorization and Accounting (AAA) server.

Preferably the step (i) further includes: allocating, by the controller, an IP address for the user through a current vRG of the user after receiving an access grant message from the AAA server.

The invention further provides a control apparatus for managing a nomadic service in a Software Defined Network (SDN), the control apparatus including: i. a receiving device configured to receive information related to the nomadic service, wherein the information related to the nomadic service includes a delivery path establishment request; ii. a service module determining device configured to instantiate a service module in a corresponding virtual Residential Gateway (vRG) platform, or to select a service module in a residential gateway of the user, based upon the nomadic service; and iii, a path establishing device configured to configure a network delivery path between the user and the service module based upon the path establishment request and a position of the service module.

Preferably the service module determining device is configured to determine the position of the service module based upon mobility of the user, and an implementation manner of the vRG in the network, wherein when each of the vRGs in the network is implemented in a centralized vRG platform, the controller selects the service module in the residential gateway of the user for the nomadic service; and when the vRGs in the network are implemented in a distributed manner, the controller instantiates the service module in a current vRG of the user, or instantiates a temporary virtual gateway including the service module in the centralized vRG platform, based upon the mobility of the user; wherein the centralized vRG platform is located in a broadband network gateway (BNG) or between the BNG and a home network access node or in a data center connected with an access network.

Preferably when the nomadic request received by the control apparatus is included in an authentication request of the user, the control apparatus incorporates the authentication request into an access request, and sending the access request to an Authentication, Authorization and Accounting (AAA) server; and the control apparatus allocates an IP address for the user through the current vRG of the user after receiving a message granting an access of the user to the network.

With the technical solutions according to the invention, the user can be provided rapidly with the service subscribed by the user through the residential gateway even if he is not at home, and moreover the control function can be centralized in the SUN controller to thereby select the optimum service provision point rapidly for the user so as to avoid a waste of resources.

BRIEF DESCRIPTION OF DRAWINGS

The invention will be better understood, and other objects, details, features and advantages of the invention will become more apparent, from the following description of embodiments of the invention taken with reference to the drawings in which.

DETAILED DESCRIPTION OF EMBODIMENTS

Figure 1:
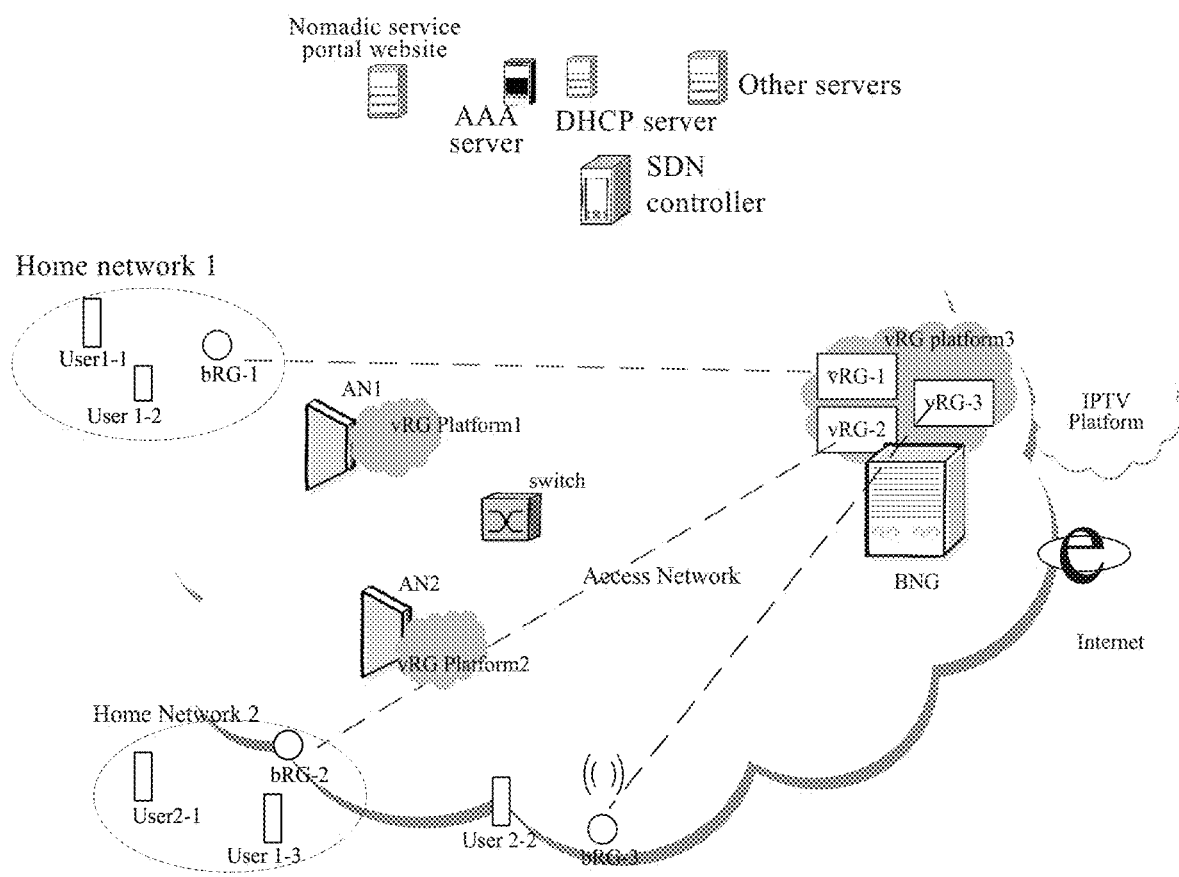
FIG. 1 illustrates a schematic diagram of a network architecture according to an embodiment of the invention.

Preferred embodiments of this disclosure will be described below in further details with reference to the drawings. Although the preferred embodiments of this disclosure are illustrated in the drawings, it shall be appreciated that this disclosure can be embodied in various forms but will not be limited to the embodiments described here. On the contrary, these embodiments are provided to make this disclosure more thorough and complete and to enable the scope of this disclosure to be conveyed fully to those skilled in the art.

The invention is intended to dynamically instantiate a service module at the optimal site for a nomadic service requested by a nomadic user. That is, after receiving the nomadic service request from the nomadic user, an SDN controller obtains a profile for this requested service, finds the optimal site (e.g., either an vRG for the nomadic site, or a vRG platform, proximate to a BNG or of a data center) to instantiate the corresponding module for the requested service, and configures corresponding network elements to thereby form a path with a corresponding QoS for delivering the service to the nomadic user.

In the network architecture with the vRG platform, the vRG can be implemented either in a centralized or distributed manner. When the vRGs are implemented in the distributed manner differently, the SDN controller decides where to instantiate the corresponding service module to serve the nomadic user, which can be a vRG which serves a home network of the nomadic user or the vRG platform at the BNG or the vRG pool in the data center. The SDN controller sends a corresponding command to the corresponding platform to thereby dynamically instantiate the serving module for the nomadic user.

In order to facilitate an implementation of the nomadic service, the invention further proposes adding information tables associated with the nomadic service to the vRG, e.g., a nomadic information table and a service profile table, where the nomadic information table can maintain the statuses of all the users by recording whether they are allowed to be nomadic to another site than a primary site, when they are allowed to obtain the nomadic service. The service profile table can maintain profiles for respective services subscribed by the home network, where the service profiles include bandwidth requirements for the services, and other service modules implemented in the vRG (e.g., a codec for a media program).

FIG. 1 illustrates a schematic diagram of the network architecture according to an embodiment of the invention.

This network architecture generally includes the following components:

(1) The SDN controller and other auxiliary control/management servers: the SDN controller implements the entire control plane of an access network, that is, the control plane of the access network is centralized in the SDN controller. The SDN controller has interfaces to the other auxiliary servers (e.g., Authentication, Authorization and Accounting (AAA) server, a DHCP server, other application servers like a policy server, a nomadic server, etc.). The SDN controller has the following functions: (1) to control/manage all the forwarding devices in the access network (e.g., a bRG in the home network, an access node, a switch, and a BNG); and (2) to instantiate/update the vRG needed for the home network, including allocating appropriate resources for the vRG, instantiating appropriate modules in the vRG, etc.

Particularly the SDN controller is further provided with a service module determining device configured to instantiate the new service module in the corresponding vRG platform, or to select the service module in the residential gateway, for the nomadic service.

(2) The forwarding devices in the access network, e.g., the residential gateway bRG1-2, the access node AN1-2, the switch, the BNG, etc., which can become simple forwarding devices to forward traffic as configured by the SDN controller, because all the control functions are performed in the SDN controller.

(3) The virtual Residential Gateway (vRG) platform which is just a collection of computing resource for implementing the vRG therein as needed, where some of the computing resources can be attached to the access node, and the others can be attached to the 13 NG, or implemented in the data center connected to the access network. This platform is controlled by the SDN controller determining where to instantiate the vRG for a specific home network and how many resources to be allocated for the vRG, and to instantiate specific modules in the vRG. Normally in the vRG platform, there is a vRG which serves a bRG in a home network. Once the vRG is instantiated, there is a logic link between the vRG and the residential bRG.

For the vRG, two information tables can be further introduced to support the nomadic function, which can be a nomadic information table and a service profile table, where the nomadic information table keeps information for devices/accounts which belong to the home network, and each entry has the following attributes: a device/user name, an MAC address/password, nomadic property to indicate whether the device/account can get the nomadic service through the vRG, a current status to record where the device/account is currently used, i.e., either at home or nomadic, and a survival time to set a period of tome for which the device/account can get the nomadic support.

When a user device/account with the nomadic right has moved to a nomadic site, if it requests for a service subscribed by its home network, then the request will be checked in both the AAA server and in the residential vRG. Thus it can be determined from Table 1 whether some user device has the nomadic right, a period of time for which it can be nomadic, etc.

TABLE 1

Nomadic Information Table

| Device/user Name | MAC Address/password | Nomadic property | Current status | Survival time |
|---|---|---|---|---|
| Camera | MAC1 | None | In home | forever |
| TV | MAC2 | None | In home | forever |
| UE1 | USIM/MAC3 | Yes | In home | forever |
| UE2 | MAC4 | Yes | Nomadic | forever |
| Tom | password1 | Yes | nomadic | forever |
| Temporary-account | password2 | Yes | nomadic | 3:00~5:00 |
| ... | ... | ... | ... | ... |

The service profile table records profile information for services which have been subscribed by the home network. The profile information includes service names,

TABLE 2

Service profile table

| Service Name/ID | Service Type | Minimal Bandwidth | Maximum bandwidth | Serving module in vRG |
|---|---|---|---|---|
| IPTV | Constant bandwidth | 5M | 5M | Codec |
| OTT game | Variable bandwidth | 1M | 3M | Specific module |
| ... | ... | ... | ... | ... |

Two devised embodiments of the invention, i.e., procedures of providing a nomadic user with a nomadic service, will be described below further to the description above.

The first embodiment relates to a procedure of providing a nomadic service when network connection is provided by a local site.

When network connection is provided by a local site, a user can access the Internet without authorization from an access network. For example, when the user 1-3 is located at the home of the user 2-1, the user 2-1 just tells the user 1-3 a password of his home network connection, and then the user 1-3 can use the password to connect to the home network of the user 2-1 and access the Internet.

Figure 2:
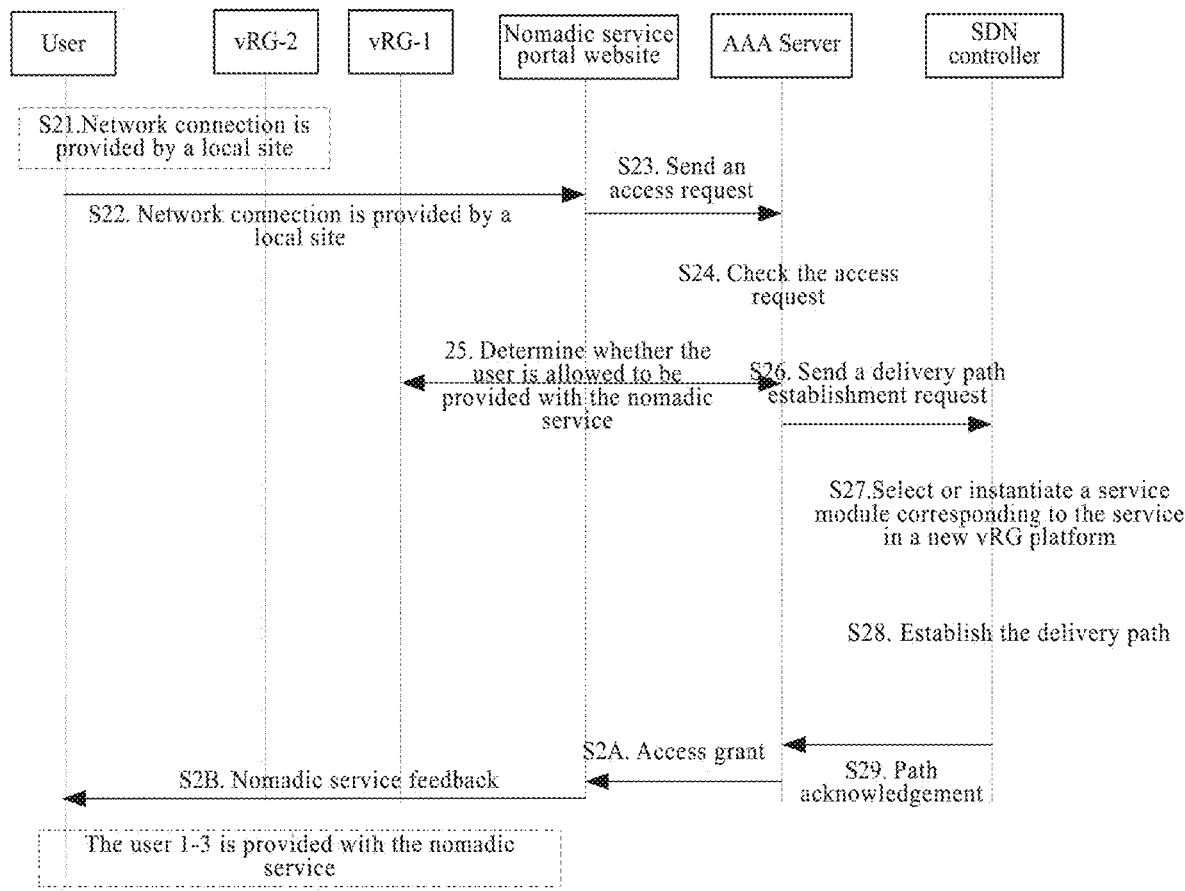
FIG. 2 illustrates a procedure of providing a nomadic service according to an embodiment of the invention.

FIG. 2 illustrates a procedure of providing a nomadic service according to an embodiment of the invention, where the user 1-3 requests for a nomadic service subscribed through his residential gateway vRG-1.

S21. The user 1-3 is provided with network connection through the local site.

In this step, the local site (i.e., the vRG2) allocates an IP address for the user 1-3 so that the user 1-3 can access the Internet.

S22. The user 1-3 sends a nomadic service request.

In this step, the user 1-3 accesses a nomadic service portal website and requests for a nomadic service. The first request message input by the user includes residential vRG information (i.e., information about the VRG-1), authorization information of an Authentication, Authorization and Accounting (AAA) server of an operator for the vRG-1, identification information of the user 1-3 in the vRG-1, and an indication information of the nomadic service requested by the user 1-3.

Particularly a user field includes a device name and an MAC address/password, e.g., Nomadic-user_ID, etc., and a domain filed includes a service ID, a residential gateway ID, and an operator ID, e.g., the character string "Service-ID.home_RG-M.Operator-ID".

S23. The nomadic service portal website sends an access request message to the AAA server.

In this step, the nomadic service portal website constructs the access request message including the nomadic service request based on the nomadic service request from the user 1-3, and then sends the access request message to the AAA server for authentication.

S24. The AAA server checks the access request message.

In this step, the AAA server will firstly check against the service profile table above (Table 2) whether the home network of the user (i.e., the vRG-1) has subscribed the service indicated in the nomadic service request. If the vRG-1 has subscribed the service, then the AAA server will further check with the vRG-1 whether the user 1-3 is allowed to be provided with his requested service at the nomadic site; otherwise, the AAA server will reject the service request of the user.

S25. The VRG-1 determines whether the user is allowed to be provided with the corresponding service.

In this step, since the nomadic information table (Table 1) has been stored in the vRG-1, the vRG-1 can check against Table 1 whether the user 1-3 can be provided with his requested service at that time, and if yes, then the vRG-1 will return the corresponding service profile retrieved from the service profile table thereof to the AAA server.

S26. The AAA server sends a delivery path establishment request message to the SDN controller.

In this step, since it has been determined in the step S25 that the user 1-3 can be provided with his requested nomadic service, the AAA server will send a delivery path establishment request message to the SDN controller to request for a delivery path for the nomadic service. In this embodiment, the path establishment request message includes information about two endpoints (i.e., the bRG2 and the service provision point), a corresponding service feature (e.g., a bandwidth), and other related parameters. The service provision point refers to a vRG including a service module, and apparently the service provision point at this time has not been determined, so the path establishment request message will request the SDN controller for specifying a particular position of the service provision point.

The related parameters here can include related resource calculation parameters (e.g., a CPU demand, a storage demand, etc.) required for a new service module (located either in the vRG of the nomadic site or a newly instantiated temporary vG).

S27. The SDN controller selects the corresponding service module in the residential gateway of the user or instantiates a service module corresponding to the service in a new vRG platform.

In this step, the SDN controller computes the optimal site where the corresponding service module will be instantiated, which can be either the nearest vRG pool or the vRG-2. After the optimal site is located, the SDN controller instantiates the corresponding service module. At this time it can be determined which vRG the service provision point in the step S26 is.

There may include but will not be limited to the following three scenarios of a rule under which the optimum site, where the service module will be instantiated, is selected, dependent upon the mobility of the user 1-3, and the implementation of the vRG:

In the first scenario, the vRGs are centralized in the vRG platform at the BNG.

At this time the vRG-2 and the vRG-1 are implemented in a centralized vRG platform, so data will be exchanged between them both over less resources and for a shorter period of time, and thus in this scenario, the service module in the vRG-1 corresponding to the service requested by the user 1-3 can be reused. As can be appreciated, the service module in the vRG-1 corresponding to the service requested by the user 1-3 can still be used when the user 1-3 moves frequently between respective network points in the first scenario.

In the second scenario, the vRGs are implemented in a distributed manner in the access network and there is low mobility of the user.

In this scenario, the vRG-1 corresponding to the home network 1 is implemented in the vRG platform 1 at the Access Node (AN) 1, and correspondingly the vRG-2 corresponding to the home network 2 is implemented in the vRG platform 2 at the AN 2. Apparently if the service module in the vRG-1 is still used at this time, then there will be a very long delivery path, so the SDN controller will instantiate a service module again.

The low mobility of the user means that the user will reside in the same network (e.g., the home network 2) for a long period of time, so the service module can be instantiated in the vRG-2 to thereby shorten the delivery path. At this time since the service module needs to be configured on the original vRG2, the vRG2 will be allocated more resources to operate the service module for the service requested by the user 1-3, e.g., an additional delivery path, an extended bandwidth, etc.

In the third scenario, the vRG is implemented in a distributed manner in the access network and user has a high mobility.

Like the second scenario, the vRG-1 and the vRG-2 are implemented respectively in the vRG platforms 1 and 2 at the AN1 and the AN2 in this scenario.

The high mobility of the user means that the user residing in the respective networks for a short period of time will move between the respective network points, so if the service module is instantiated frequently in the respective vRGs, then significant amounts of time and resources will be consumed. Thus in this scenario, the SDN will instantiate a temporary vG including the service module in the vRG platform closer to the BNG than the AN1 and the AN2, so that even if the home network of the user 1-3 is switched frequently, he will be served by the temporary vRG platform through connection provided by the current home network.

As can be appreciated, the high or low mobility of the user can be determined by being compared with a threshold, or the mobility of the user has been preset in advance by the SDN controller. Thus in the second and third scenarios, where the vRGs in the network are implemented in a distributed manner, the SDN controller instantiates the service module in the current vRG of the user, or instantiates the temporary vG including the service module in the vRG platform at the BNG node, dependent upon the mobility of the user.

The three scenarios above merely illustrates scenarios where the vRG platform is implemented at the node of the BNG, but actually the vRG platform can alternatively be located at the switch, the server, or another position with computing resources, between the AN and the BNG; and alike the vRG platform can alternatively be the data center currently connected with the current access network.

S28. The SDN controller establishes the delivery path.

In the step 27, the SDN controller has determined where to instantiate the service module, so the SDN controller will calculate a delivery path satisfying the QoS requirement based upon the result of the step S27, and set up the delivery path between the bRG-2 and the service provision point. Apparently the other network elements involved in the delivery path will also be configured correspondingly by the SDN controller to comply with the demand for the nomadic service.

Its S29. The SDN controller sends a path establishment acknowledgement message (Path-Establish-Ack) to the AAA server after establishing the delivery path successfully.

S2A. The AAA server sends an Access Accept message to the nomadic service portal server.

S2B. The nomadic server a reply message to the nomadic service request to the user 1-3.

With the steps above, the user 1-3 can obtain his requested nomadic service at the nomadic site, where the corresponding service is delivered firstly to the vRG including the service module for further processing, and then delivered to the user 1-3.

Thus firstly the user is provided with network connection, and only then it will be determined whether the user can be provided with the nomadic service, in the first embodiment.

In the second embodiment, network connection is provided by the operator.

In this scenario, the authentication request message includes the nomadic service request. After receiving the authentication request, the SDN controller forwards it to the AAA server for authentication. Upon successful authentication, IP address allocation will be triggered, and upon successful IP address allocation, a service delivery path request will be triggered to the SDN controller, which will firstly instantiate the service module at the most appropriate site, and then compute and configure the delivery path for the nomadic user.

Figure 3:
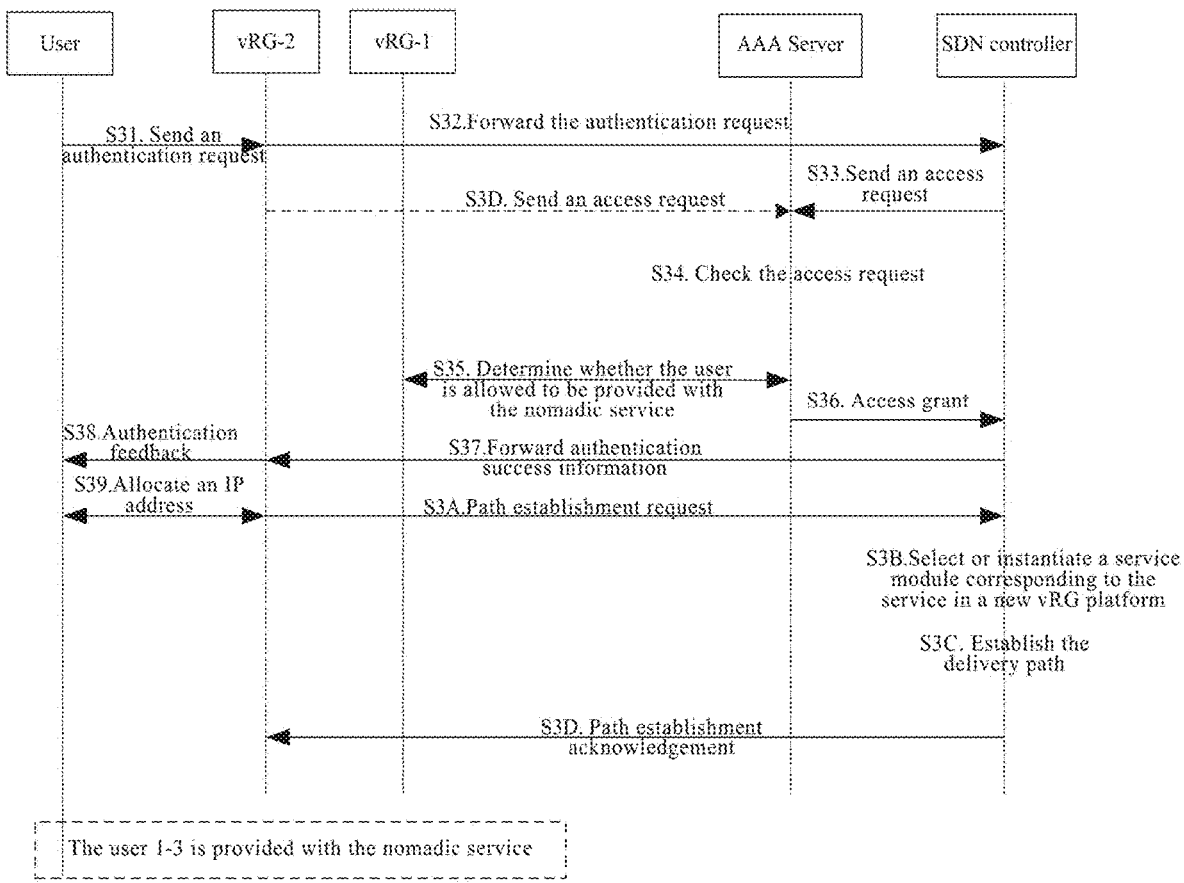
FIG. 3 illustrates a procedure of providing a nomadic service according to another embodiment of the invention.

FIG. 3 illustrates a procedure of providing a nomadic service according to another embodiment of the invention.

S31. The user 1-3 sends an authentication request message to the vRG-2.

In this step, the authentication request message includes a nomadic service request, and as can be apparent from the description above, the nomadic service request can include residential vRG information (i.e., information about the vRG-1), authorization information of the Authentication, Authorization and Accounting (AAA) server of the operator for the vRG-1, identification information of the user 1-3 in the vRG-1, and an indication information of the nomadic service requested by the user 1-3.

S32. The vRG-2 forwards the authentication request to the SDN controller.

S33. The SDN controller forwards the access request to the AAA server so that the AAA server determines whether the user 1-3 can obtain a service subscribed by the user through the residential gateway vRG-1.

Alternatively in this embodiment, the steps S32 and S33 can be performed in the step S3E where the current vRG of the user (i.e., the vRG-2) transmits the authentication request directly to the AAA server.

S34. The AAA server checks whether the user 1-3 can obtain the service subscribed by the user through the residential gateway vRG-1.

In this step, the AAA server will firstly check against the service profile table above (Table 2) whether the residential gateway of the user 1-3 (i.e., the vRG-1) has subscribed the service indicated in the first request. If the vRG-1 has subscribed the service, then the AAA server will further check with the vRG-1 whether the user 1-3 is allowed to be provided with his requested service at the nomadic site.

S35. The VRG-1 determines whether the user is allowed to be provided with the corresponding service.

In this step, since the nomadic information table (Table 1) has been stored in the vRG-1, the vRG-1 can check against Table 1 whether the user 1-3 can be provided with his requested service at that time, and if yes, then the vRG-1 will return the corresponding service profile retrieved from the service profile table thereof to the AAA server.

S36. The AAA server sends access information to the SDN controller.

If it can be determined in the step S35 that the user 1-3 can obtain the service subscribed by the user through the vRG-1, then in the step S36, the AA server will forward an access grant to the SDN controller based upon the result to notify the SDN controller that the user 1-3 has been authenticated successfully.

S37. The SDN controller forwards authentication success information to the vRG-2, that is, the AAA server allows the user for an access to the network.

S38. The vRG-2 returns the authentication result to the user 1-3.

In this step, a feedback message transmitted by the nomadic server to the nomadic service request is also transmitted to the user 1-3.

S39. An IP address is allocated.

In this step, the DHCP module in the vRG-2 will allocate an IP address for the user 1-3.

S3A. A delivery path establishment request message is sent.

After the IP address is allocated, the vRG-2 sends a path establishment request to the SDN controller. Alike the path establishment request includes information about two endpoints (i.e., the bRG2 and the service provision point), a corresponding service feature (e.g., a bandwidth), etc. The service provision point here refers to a vRG including a service module.

S3B. The SDN controller selects or instantiates a service module corresponding to the service.

In this step, the SDN controller calculates the optimum position where the corresponding service module will be instantiated, which can be the nearest vRG pool or the vRG2. After the optimum position is located, the SDN controller instantiates the corresponding service module. At this time it can be determined which vRG the service provision point in the step S3A is.

Alike there may include but will not be limited to the three scenarios, described in the first embodiment, of a rule under which the optimum site, where the service module will be instantiated, is selected, dependent upon the mobility of the user 1-3, and the implementation of the vRG.

S3C. The SDN establishes the delivery path.

In the step 3B, the SDN controller has determined where to instantiate the service module, so the SDN controller will establish the delivery path between the bRG-2 and the service provision point based upon the result of the step S3B.

S3D. The SDN controller sends a path establishment acknowledgement message to the vRG-2.

With the steps, the user 1-3 can obtain his requested nomadic service at the nomadic site, where the corresponding service is delivered firstly to the vRG including the service module for further processing, and then delivered to the user 1-3.

Thus in the second embodiment, only the user with network connection can be served, that is, the user can be provided with network connection only if it is determined that the user can be provided with the nomadic service.

The invention further proposes an SDN control apparatus including: a receiving device 41 configured to receive a path establishment request to deliver a nomadic service; a service module determining device 42 configured to instantiate a service module in a corresponding virtual Residential Gateway (vRG) platform, or to select a service module in a residential gateway of the user, for the nomadic service; and a path establishment device 43 is configured to configure a network delivery path between the user and the service module based upon the path establishment request, and the position of the service module.

Preferably the service module determining device is configured to determine the position of the service module based upon mobility of the user, and an implementation of the vRG in the network, where when the vRG in the network is implemented in a centralized vRG platform at a broadband network gateway (BNG), the controller selects the service module in the residential gateway of the user for the nomadic service; and when the vRGs in the network are implemented in the distributed manner and the mobility of the user is below a threshold, the controller instantiates the service module in the current vRG of the user; and when the vRGs in the network are implemented in the distributed manner and the mobility of the user is above the threshold, the controller generates a temporary vG including the service module in the vRG platform at the BNG node.

Preferably when the nomadic request received by the control apparatus is included in an authentication request of the user, the control apparatus includes the authentication request in an access request, and sends the access request to an Authentication, Authorization and Accounting (AAA) server; and the control apparatus allocates an IP address for the user through the current vRG of the user after receiving a message granting an access of the user to the network.

Those skilled in the art can appreciate that the instances above are merely illustrative but not intended to limit the application scope of the invention. Those skilled in the art can decide to how to implement the functions described above in a number of implementations for respective specific applications, but the implementation decision shall not be construed as departing from the claimed scope of the invention.

The invention claimed is:

1. A method of providing a nomadic service, the method comprising steps of
   i. sending, by a user, a nomadic service request to an Authentication, Authorization and Accounting (AAA) server to determine whether the nomadic service request is allowed;
   ii. causing, by sending the nomadic request to the AAA server, a Software Defined Network (SDN) controller to initiate a service module for the nomadic service in a corresponding virtual Residential Gateway (vRG) platform or to select a corresponding service module in a vRG of the user, if the nomadic service request is allowed, based upon the nomadic service and upon a path establishment request; and
   iii. causing the SDN controller to determine and configure a network delivery path between the user and the service module based upon the path establishment request and a position of the service module;
   wherein the step (ii) comprises
   causing the SDN controller to determine the position of the service module based upon mobility of the user and implementation manner of vRGs in the network, wherein
   when each of the vRGs in the network is implemented in a centralized vRG platform, causing the SDN controller to select the service module in the vRG of the user for the nomadic service; and
   when the vRGs in the network are implemented in a distributed manner, causing the SDN controller to initiate the service module in a current vRG of the user, or instantiating a temporary virtual gateway comprising the service module in the centralized vRG platform, based upon the mobility of the user,
   wherein the centralized vRG platform is located in a broadband network gateway (BNG) or between the BNG and a home network access node or in a data center connected with an access network.

2. The method according to claim 1, wherein the step (i) comprises:
   sending, by the user, the nomadic service request to a nomadic service portal website through network connection provided by the current vRG, and then sending, by the nomadic service portal website, an access request comprising the nomadic service request to the AAA server.

3. The method according to claim 1, wherein:
   the step (i) comprises sending, by the user, an authentication request comprising the nomadic service request to the SDN controller through the current vRG, such that the SDN controller is caused to send an access request comprising the authentication request to the AAA server, or causing, by the user, the current vRG to send the authentication request directly to the AAA server; and
   the step (ii) comprises causing the AAA server to send the path establishment request to the SDN controller.

4. The method according to claim 1, wherein the step (ii) comprises:
   causing the AAA server to check whether the nomadic service has been subscribed by the vRG of the user, and if yes, then to check, whether the user is allowed to be provided with the nomadic service by using the vRG of the user.

5. The method according to claim 3, wherein the step (iii) further comprises:
   when the nomadic service request is allowed, the SDN controller to send an access grant message to the current vRG to thereby provide the user with an IP address and to send the path establishment request to the SDN controller, through the current vRG.

6. A method of managing a nomadic service in a Software Defined Network (SDN) controller, the method comprising:
   i. receiving a path establishment request to deliver the nomadic service;
   ii. instantiating a service module for the nomadic service in a corresponding virtual Residential Gateway (vRG) platform or selecting a corresponding service module in a vRG of a user, based upon the nomadic service; and
   iii. determining and configuring a network delivery path between the user and the service module based upon the path establishment request and position of the service module,
   wherein the step (ii) comprises
   determining the position of the service module based upon mobility of the user and implementation manner of vRGs in the network, wherein:
   when each of the vRGs in the network is implemented in a centralized vRG platform, the controller selecting the service module in the vRG of the user for the nomadic service; and
   when the vRGs in the network are implemented in a distributed manner, the controller instantiating the service module in a current vRG of the user, or instantiating a temporary virtual gateway comprising the service module in the centralized vRG platform, based upon the mobility of the user;

wherein the centralized vRG platform is located in a broadband network gateway (BNG) or between the BNG and a home network access node or in a data center connected with an access network.

7. The method according to claim 6, wherein:

the delivery path establishment request comprises information about the current vRG of the user, a nomadic service provision point request, and a bandwidth corresponding to the nomadic service.

8. The method according to claim 7, wherein the step (ii) further comprises:

locating, by the controller, the nomadic service provision point at the determined position of the service module after determining the position of the service module.

9. The method according to claim 6, wherein the step (i) further comprises:

when the nomadic request received by the controller is comprised in an authentication request of the user, incorporating, by the controller, the authentication request into an access request, and sending the access request to an Authentication, Authorization and Accounting (AAA) server.

10. The method according to claim 9, wherein the step (i) further comprises:

allocating, by the controller, an IP address for the user through the current vRG of the user after receiving an access grant message from the AAA server.

11. A control apparatus for managing a nomadic service in a Software Defined Network (SDN), the control apparatus comprising:

i. a receiving device configured to receive information related to the nomadic service, wherein the information related to the nomadic service comprises a delivery path establishment request;

ii. a service module determining device configured to instantiate a service module in a corresponding virtual Residential Gateway (vRG) platform or to select a service module in a vRG of a user, based upon the nomadic service; and iii. a path establishing device configured to configure a network delivery path between the user and the service module based upon the path establishment request and a position of the service module, wherein the service module determining device is configured to determine the position of the service module based upon mobility of the user and implementation manner of vRGs in the network, wherein when each of the vRGs in the network is implemented in a centralized vRG platform, the controller selecting the service module in the residential gateway of the user for the nomadic service; and when the vRGs in the network are implemented in a distributed manner, the controller instantiating the service module in a current vRG of the user, or instantiating a temporary virtual gateway comprising the service module in the centralized vRG platform, based upon the mobility of the user;

wherein the centralized vRG platform is located in a broadband network gateway (BNG) or between the BNG and a home network access node or in a data center connected with an access network.

12. The control apparatus according to claim 11, wherein:

when the nomadic request received by the control apparatus is comprised in an authentication request of the user, the control apparatus incorporating the authentication request into an access request and sends the access request to an Authentication, Authorization and Accounting (AAA) server; and the control apparatus allocating an IP address for the user through the current vRG of the user after receiving a message granting an access of the user to the network.

* * * * *

UNITED STATES PATENT AND TRADEMARK OFFICE
CERTIFICATE OF CORRECTION

PATENT NO. : 10,958,651 B2
APPLICATION NO. : 15/529711
DATED : March 23, 2021
INVENTOR(S) : Haibo Wen et al.

It is certified that error appears in the above-identified patent and that said Letters Patent is hereby corrected as shown below:

In the Claims

Column 14, Line number 4: in Claim 11, delete "in" and insert -- iii --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*